(12) United States Patent
Kanehara

(10) Patent No.: US 6,896,633 B2
(45) Date of Patent: May 24, 2005

(54) BELT FOR CONTINUOUSLY VARIABLE TRANSMISSION

(75) Inventor: Shigeru Kanehara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/213,447

(22) Filed: Aug. 7, 2002

(65) Prior Publication Data

US 2003/0040387 A1 Feb. 27, 2003

(30) Foreign Application Priority Data

Aug. 10, 2001 (JP) ........................................ 2001-244644

(51) Int. Cl.⁷ ................................................. F16G 5/16
(52) U.S. Cl. ..................................... 474/242; 474/201
(58) Field of Search ................................ 474/242, 201, 474/240, 245, 272; 148/196, 210, 211, 222; 219/137; 266/51; 29/892, 892.1

(56) References Cited

U.S. PATENT DOCUMENTS

| | | | |
|---|---|---|---|
| 3,720,113 A | | 3/1973 | Van Doorne et al. |
| 4,427,401 A | * | 1/1984 | Hendriks et al. ........... 474/201 |
| 4,741,727 A | | 5/1988 | Hattori et al. |
| 4,824,424 A | * | 4/1989 | Ide et al. .................... 474/242 |
| 4,826,473 A | * | 5/1989 | Miyawaki ................... 474/240 |
| 5,004,450 A | * | 4/1991 | Ide .............................. 474/242 |
| 6,440,025 B1 | * | 8/2002 | Ohnuki ....................... 474/242 |

2002/0068654 A1 6/2002 Baumann et al.

FOREIGN PATENT DOCUMENTS

| | | |
|---|---|---|
| EP | 0 468 770 A2 | 1/1992 |
| GB | 2092049 A * | 8/1982 |
| JP | 03-229038 | 10/1991 |
| JP | 03-236415 A * | 10/1991 |
| JP | 06-93277 A * | 4/1994 |
| JP | 08-134700 | 5/1996 |
| JP | 2000-314427 A * | 11/2000 |
| JP | 2000-317659 A * | 11/2000 |

OTHER PUBLICATIONS

Patent Abstracts of Japan; Pub. No. 08-134700, published May 28, 1996.
Patent Abstracts of Japan; Pub. No. 03-229038, published Nov. 10, 1991.

* cited by examiner

Primary Examiner—Marcus Charles
(74) Attorney, Agent, or Firm—Arent Fox PLLC

(57) ABSTRACT

A belt for a continuously variable transmission includes a metal ring assembly and a plurality of metal elements formed of a carbon steel and supported on the metal ring assembly. A recess of the metal element at which stress concentrates, namely, undercut portions of a root of a neck, a root of an engaging projection, and recesses of an element body, are removed. The carbon concentration in the removed portions is lower than that in the other potions, thereby enhancing the toughness, fatigue strength, and impact strength while maintaining, at a high level, the surface hardness of portions at which stress does not concentrate, thereby obtaining a wear resistant belt.

16 Claims, 9 Drawing Sheets

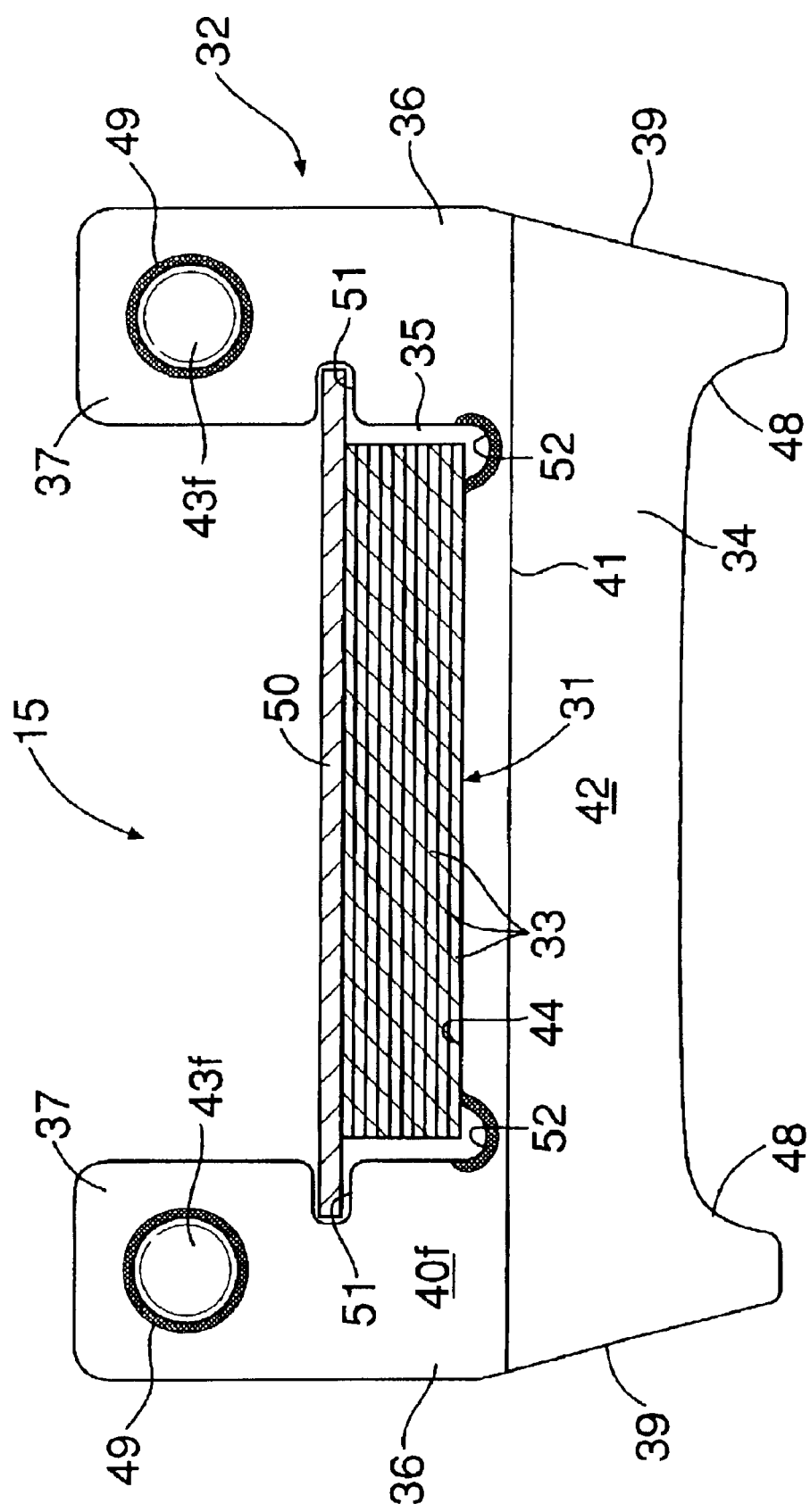

BELT FOR CONTINUOUSLY VARIABLE TRANSMISSION

BACKGROUND OF THE INVENTION

1. Field of the Invention

The present invention relates to a belt for a continuously variable transmission, including a metal ring assembly and a plurality of metal elements formed from carbon steel and supported on the metal ring assembly. More particularly, the present invention relates to a belt having a carbon concentration in a recess of the metal element that is less than in other portions of the metal element.

2. Description of the Related Art

A metal element produced by subjecting a carbon steel, such as, for example, SKS95 or the like, to hardening and tempering treatment has been conventionally used as a metal element in forming a belt for a continuously variable transmission. The surface hardness of the conventional metal element is obtained by maintaining the carbon steel at a temperature equal to or greater than an austenitizing temperature, which is approximately 750° C., during the hardening treatment for at least 15 minutes.

The conventional metal element includes an element body that abuts a V-face of a pulley, a neck extending radially outward from a laterally central portion of the element body, and an ear leading to a radially outer side of the neck. The metal ring assembly is fit into a ring slot defined by the element body, the neck, and the ear. Because stress concentrates at the bottom of the ring slot, in particular, at a first connection between the element body and the neck, as well as a second connection between the ear and the neck, undercut portions are formed at the stress concentration regions of the ring slot to alleviate the concentration of stress therein.

Of the above-described two connections, the stress concentration typically occurs at the radially inner side, specifically, the first connection between the element body and the neck. The first connection is subjected to the harshest conditions in terms of strength. Japanese Utility Model Publication No. 5-14028 discloses a belt in which strength is enhanced by rounding the edge of the undercut portion formed at the first connection.

The surface of the metal element produced by subjecting the carbon steel to the hardening and tempering treatment obtains a high degree of hardness, which provides an enhanced durability against wear. Unfortunately, the enhanced hardness reduces the toughness of the metal element, which is then likely to suffer breakage or the like due to the concentration of stress. Therefore, considering that the toughness of carbon steel can be enhanced by reducing the carburization of the surface thereof, it is conceivable to enhance the fatigue strength and impact strength of the metal element by increasing the toughness of the portions of the metal at which stress typically concentrates.

SUMMARY OF THE INVENTION

It is an object of the present invention to at least overcome the above-described problems of metal elements in conventional metal belts used in continuously variable transmissions.

It is also an object of the present invention to enhance the toughness of the known portions of a metal element at which stress concentrates while ensuring wear resistance of the metal element, thereby enhancing the durability of the metal element.

According to a preferred embodiment of the present invention, there is provided a belt for a continuously variable transmission, wherein the belt includes a metal ring assembly and a plurality of metal elements formed from carbon steel and supported on the metal ring assembly. The carbon concentration in a recess of the metal element in which stress concentrates is lower than other portions of the metal element to enhance the toughness of the recess.

As discussed above, the carbon concentration in the recess of the metal element is lower than in other portions of the metal element. Therefore, it is possible to enhance the toughness of the recess in which the stress concentrates to increase the fatigue strength and impact strength of the metal element, while maintaining a high surface hardness of the portions in which stress does not concentrate to ensure wear resistance. Further, although the recess having the toughness increased by reducing the carbon concentration therein obtains a lowered surface hardness, the recess is difficult to contact with another member, thereby avoiding the problem of increased wear due to lowered surface hardness.

According to a second embodiment of the present invention, in addition to the preferred embodiment, there is provided a belt for a continuously variable transmission wherein the carbon concentration in the recess of the metal element is reduced to be lower than that in other portions of the metal element by shaving off a surface of the recess after subjecting the metal element to a thermal treatment.

In this embodiment, the metal element is subjected to thermal treatment and then the surface of the recess is shaved off so the recess has a carbon concentration lower than that of the other portions of the metal element.

According to a third embodiment of the present invention, in addition to the second embodiment, there is provided a belt for a continuously variable transmission wherein the surface of the recess of the metal element is shaved off by a water jet.

In this embodiment, the surface of the recess in which the stress concentrates is shaved off or removed by the water jet, using an efficient and quick process.

According to a fourth embodiment of the present invention, in addition to the preferred embodiment, there is provided a belt for a continuously variable transmission wherein the recess of the metal element is subjected to an anti-carburizing treatment during the thermal treatment of the metal element.

In this embodiment, the recess in which the stress concentrates is subjected to anti-carburizing treatment during the thermal treatment of the metal element. As a result, the carbon concentration in the recess is lowered to be below the carbon concentration in the other portions of the metal element, thereby enhancing the toughness of the recess.

According to a fifth embodiment of the present invention, in addition to the preferred embodiment, there is provided a belt for a continuously variable transmission wherein the recess of the metal element is a root of an engaging projection that is fitted into an engaging bore of an adjacent metal element.

In this embodiment, the connection surface between the element body and the neck is shaved off, thereby enhancing the toughness of the connection at which the stress concentrates.

According to a sixth embodiment of the present invention, in addition to the preferred embodiment, there is provided a belt for a continuously variable transmission wherein the recess of the metal element is a root of an engaging projection that is fitted into an engaging bore of an adjacent metal element.

With the above arrangement, the surface of the root of the engaging projection to be fitted into the engaging bore of the adjacent metal element is removed, thereby enhancing the toughness of the root at which the stress concentrates.

BRIEF DESCRIPTION OF THE DRAWINGS

The above and other objects, features and advantages of the present invention will become apparent from the following description of the preferred embodiments taken in conjunction with the accompanying drawings, wherein:

FIG. 9 is a front view of a metal element according to a third embodiment.

DESCRIPTION OF THE PREFERRED EMBODIMENTS

A first embodiment of the present invention is described with reference to FIGS. 1 to 4.

Figure 2:
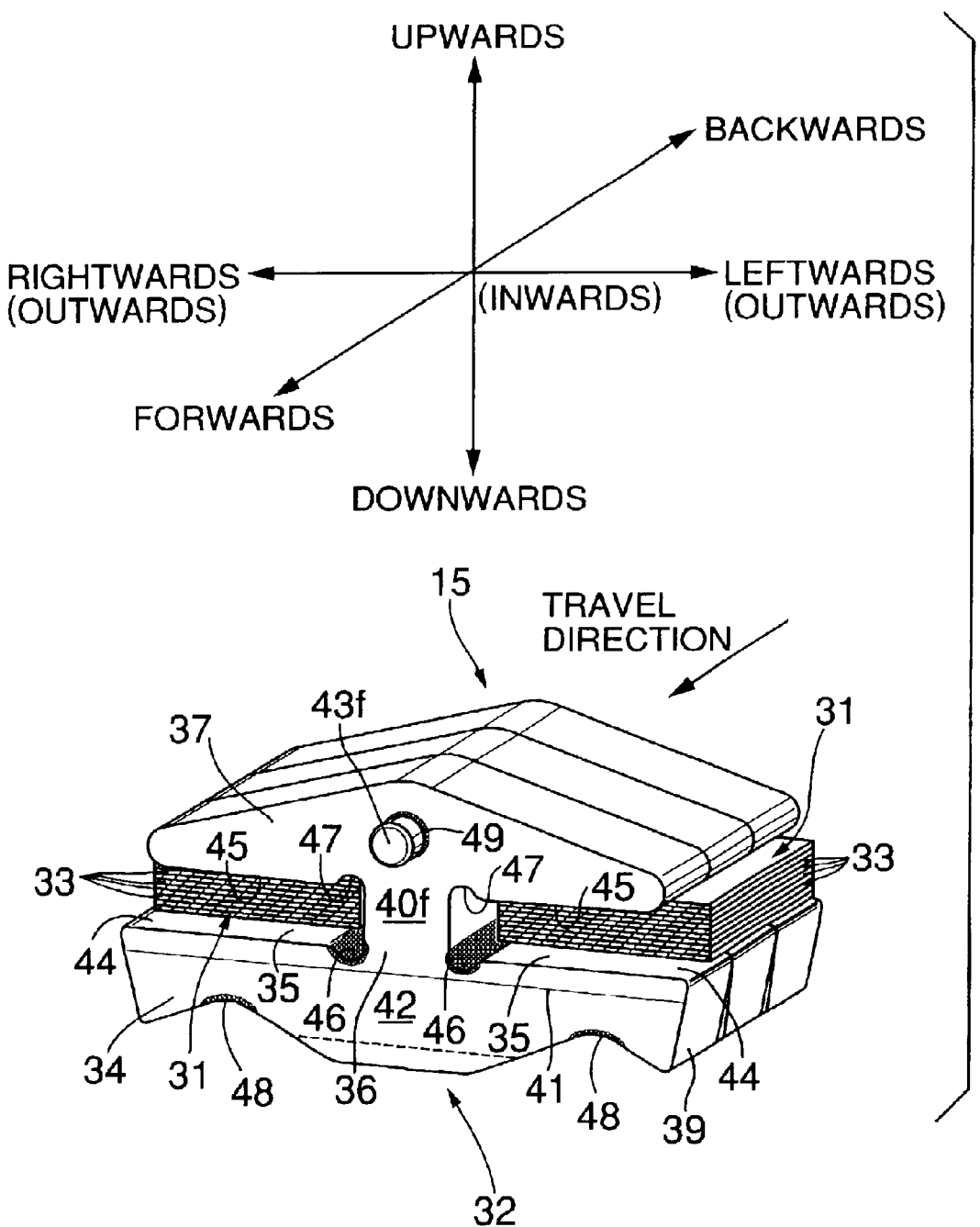
FIG. 2 is a perspective view of a portion of a metal belt used in the power transmitting system of the continuously variable transmission shown in FIG. 1.

The terms forward, backward, leftward, rightward, radially outward, and radially inward are defined in FIG. 2.

Figure 1:
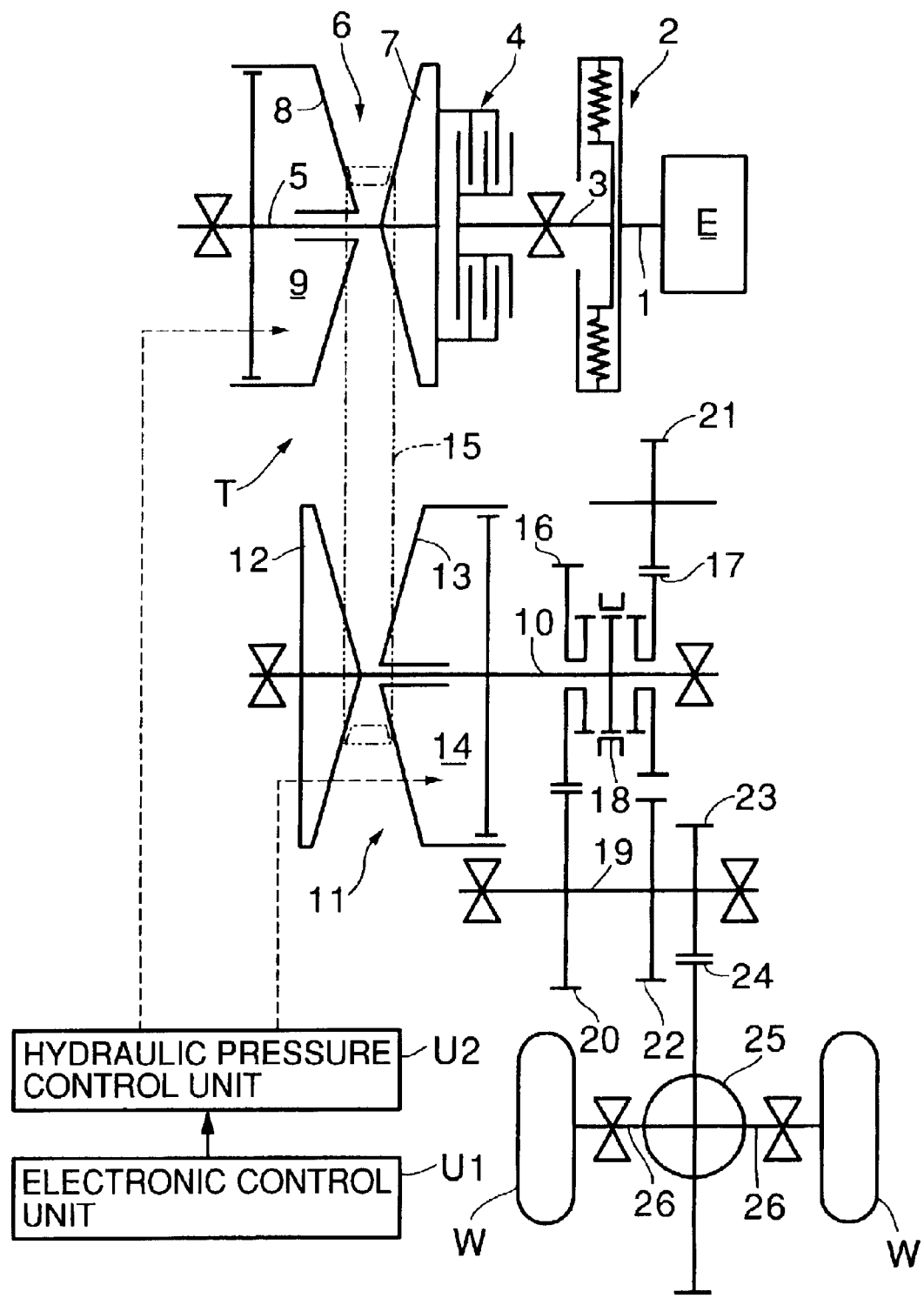
FIG. 1 is a schematic diagram of a power transmitting system in a vehicle having a continuously variable transmission.

FIG. 1 shows a schematic diagram of a metal-belt continuously variable transmission T mounted in an automobile. An input shaft 3 connected through a damper 2 to a crankshaft 1 of an engine E is connected through a starting clutch 4 to a driving shaft 5 of the metal-belt continuously variable transmission T. A driving pulley 6 mounted on the driving shaft 5 includes a stationary pulley half 7 secured to the driving shaft 5, and a movable pulley half 8 capable of moving toward and away from the stationary pulley half 7. The movable pulley half 8 is urged toward the stationary pulley half 7 by a hydraulic pressure applied to an oil chamber 9.

A driven pulley 11 mounted on a driven shaft 10 disposed in parallel to the driving shaft 5 includes a stationary pulley half 12 secured to the driven shaft 10, and a movable pulley half 13 capable of moving toward and away from the stationary pulley half 12. The movable pulley half 13 is urged toward the stationary pulley half 12 by a hydraulic pressure applied to an oil chamber 14. A metal belt 15 having a plurality of metal elements 32 supported on a pair of left and right metal ring assemblies 31, 31 is reeved between the driving pulley 6 and the drive pulley 11. See FIG. 2. Each metal ring assembly 31 has a plurality of, for example only, twelve, metal rings 33 laminated on one another.

A forward driving gear 16 for the forward movement of a vehicle and a backward driving gear 17 for the backward movement of the vehicle are relatively rotatably carried on the driven shaft 10, and can be selectively coupled to the driven shaft 10 by a selector 18. A forward driven gear 20 meshed with the forward driving gear 16 and a backward driven gear 22 meshed with the backward driving gear 17 through a backward idling gear 21 are secured to an output shaft 19, which is disposed in parallel to the driven shaft 10.

The rotation of the output shaft 19 is input to a differential 25 through a final driving gear 23 and a final driven gear 24. The rotation is then transmitted through left and right axles 26, 26 to driven wheels W, W.

A driving force from the engine E is transmitted to the driven shaft 10 through the crankshaft 1, the damper 2, the input shaft 3, the starting clutch 4, the driving shaft 5, the driving pulley 6, the metal belt 15, and the driven pulley 11. When a forward travel range is selected, the driving force from the driven shaft 10 is transmitted through the forward driving gear 16 and the forward driven gear 20 to the output shaft 19, to move the vehicle forward. When a backward travel range is selected, the driving force from the driven shaft 10 is transmitted through the backward driving gear 17, the backward idling gear 21, and the backward driven gear 22 to the output shaft 19, to move the vehicle backwards.

In these processes, the hydraulic pressures applied to the oil chamber 9 in the driving pulley 6 and the oil chamber 14 in the driven pulley 11 is controlled by a hydraulic pressure control unit U2 operated by a command from an electronic control unit U1. Accordingly, the gear change ratio of the transmission T is continuously regulated. More specifically, if the hydraulic pressure applied to the oil chamber 14 in the driven pulley 11 is increased relative to the hydraulic pressure applied to the oil chamber 9 in the driving pulley 6, the groove width of the driven pulley 11 is decreased, thereby increasing the effective radius. Correspondingly, the groove width of the drive pulley 6 is increased thereby reducing the effective radius. Therefore, the gear change ratio of the metal-belt type continuous variable transmission T is continuously varied toward "LOW". On the other hand, if the hydraulic pressure applied to the oil chamber 9 in the drive pulley 6 is increased relative to the hydraulic pressure applied to the oil chamber 14 in the driven pulley 11, the groove width of the driving pulley 6 is decreased, thereby increasing the effective radius. Correspondingly, the groove width of the driven pulley 11 is increased, thereby reducing the effective radius. Therefore, the change gear ratio of the metal-belt type continuous variable transmission T is continuously varied toward "OD".

Figure 3:
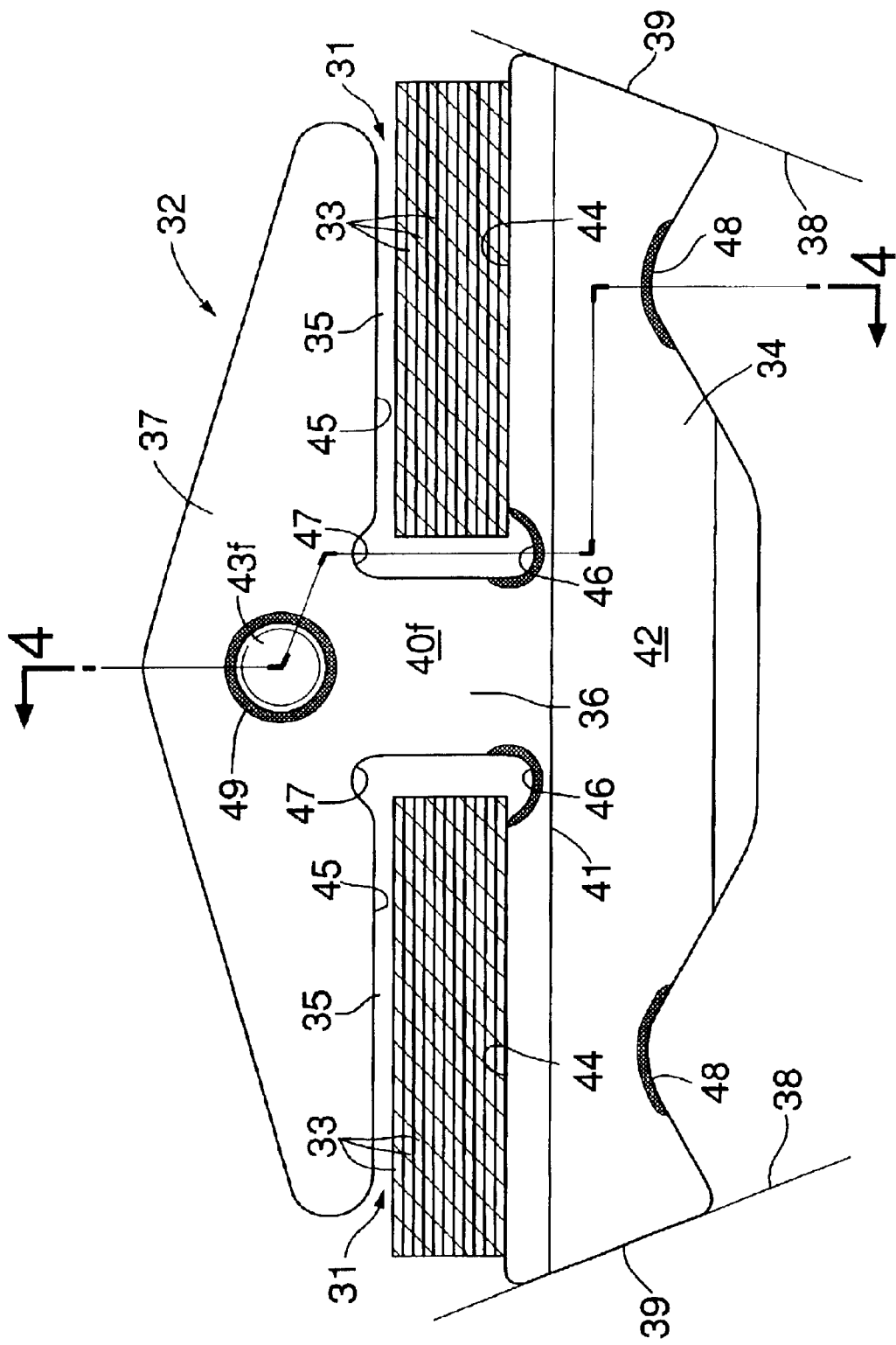
FIG. 3 is a front view of a metal element of the metal belt shown in FIG. 2.
Figure 4:
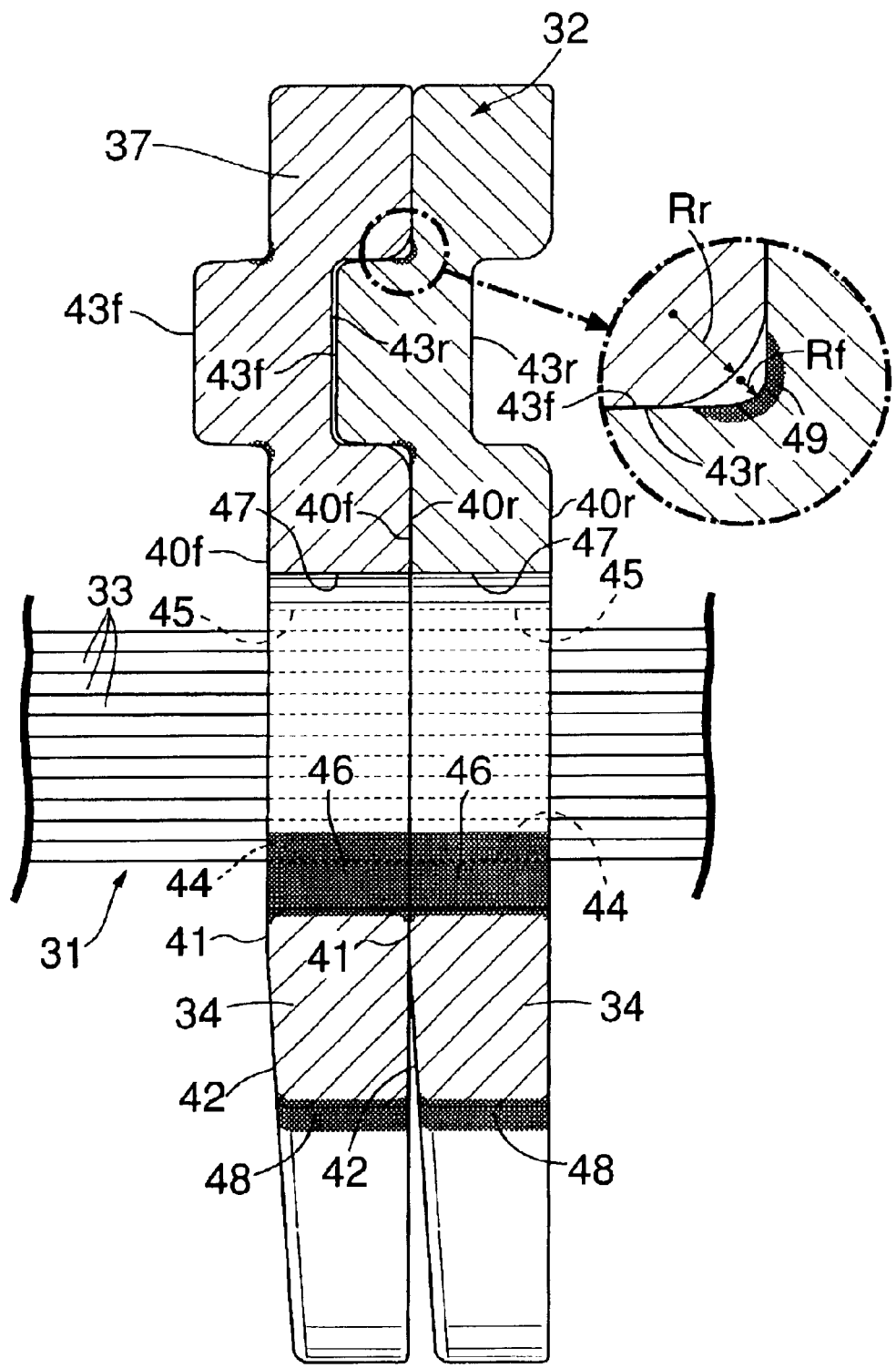
FIG. 4 is a cross-sectional view taken along a line 4—4 in FIG. 3.

As shown in FIGS. 2 to 4, each metal element 32, which is formed from a metal plate by punching, includes a substantially trapezoidal element body 34, a neck 36 located between a pair of left and right ring slots 35, 35 that receive the metal ring assemblies 31, 31, and a substantially triangular ear 37 connected to an upper portion of the element body 34 through the neck 36. The element body 34 has a pair of pulley abutment faces 39, 39 formed at laterally outer ends and that abut V-faces 38, 38 of the driving pulley 6 and the driven pulley 11. See FIG. 3. The metal element 32 has a pair of front and rear main faces $40f$, $40r$, respectively, formed on front and rear sides relative to a travel direction of the metal element 32 in such a manner that the front and rear main faces $40f$, $40r$ are perpendicular to the travel direction of the metal element and parallel relative to each other. An inclined face 42 is formed on the front side relative to the travel direction and below the front main face $40f$ with a laterally extending locking edge 41 interposed therebetween. Further, an engaging projection $43f$ and an engaging bore $43r$ that are circular in section and loosely fit within each other are formed on the front surface, that is, the front main face 40f, and the rear surface, that is, the rear main face 40r, of the ear 37 to couple the longitudinally adjacent metal elements 32, 32 to each other. Radially inner edges and radially outer edges of the ring slots 35, 35 are called saddle faces 44, 44 and lower ear faces 45, 45, respectively. Inner peripheral surfaces of the metal ring assemblies 31, 31 abut the saddle faces 44, 44. A small gap is provided between each of outer peripheral surfaces of the metal ring assemblies 31, 31 and each of the lower ear faces 45, 45.

First undercut portions 46, 46 having an arcuate shape are defined at a first connection portion between the element body 34 and the neck 36 of the metal element 32. That is, the first connection portion is formed in the bottom of the ring slots 35, 35. Second undercut portions 47, 47 having an arcuate shape are defined at a second connection portion between the element body 34 and the ear 37. That is, the second connection portion is formed in the top of the ring slots 35, 35. The first and second undercut portions 46, 46 and 47, 47, respectively, are provided in order to enhance the fatigue strength of the metal element 32 by alleviating the concentration of stress at the first connection between the element body 34 and the neck 36 as well as at the second connection between the element body 34 and the ear 37. In particular, the concentration of stress at top and bottom corners of the ring slots 35, 35 is alleviated. A pair of recesses 48, 48 are defined on laterally opposite sides of a radially inner face of the element body 34 of the metal element 32.

Figure 5:
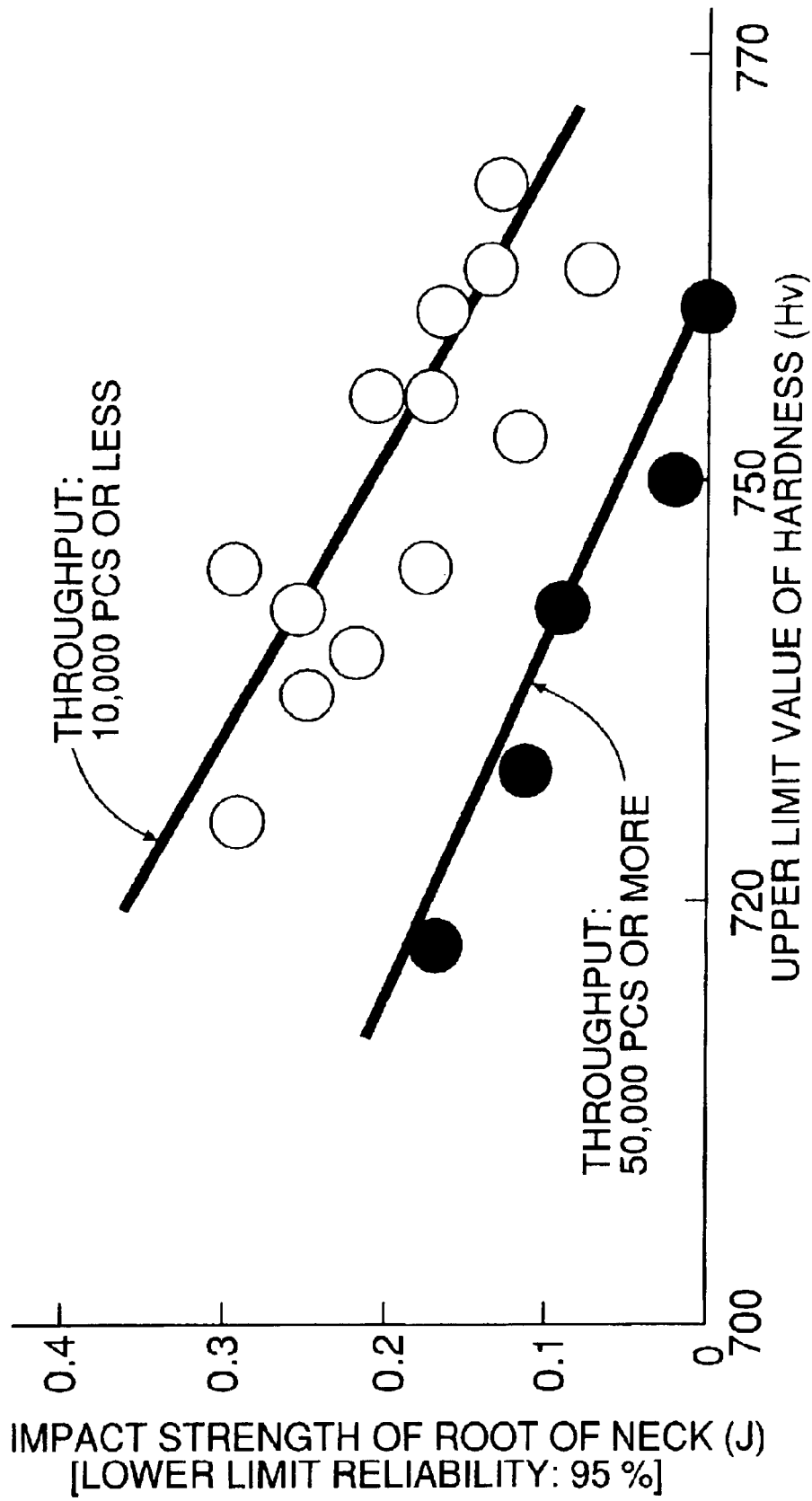
FIG. 5 is a graph showing the relationship between the surface hardness of the metal element and the strength of a root of a neck.

FIG. 5 is a graph showing the relationship between the upper limit value for the surface hardness of the metal element 32 after a thermal treatment and the shock strength of a root of the neck 36 of the metal element 32. It can be seen from the graph of FIG. 5 that the higher the surface hardness of the metal element 32, the lower the shock strength. Data represented by the blank circles correspond to cases where the number of the metal elements 32 thermally treated in batch is equal to or smaller than ten thousand. Data represented by the black circles correspond to cases where the number of the metal elements 32 thermally treated in batch is equal to or larger than fifty thousand. The shock strength decreases as the number of the metal elements thermally treated in batch increases because the uniformity of the thermal treatment is not constant.

Figure 6:
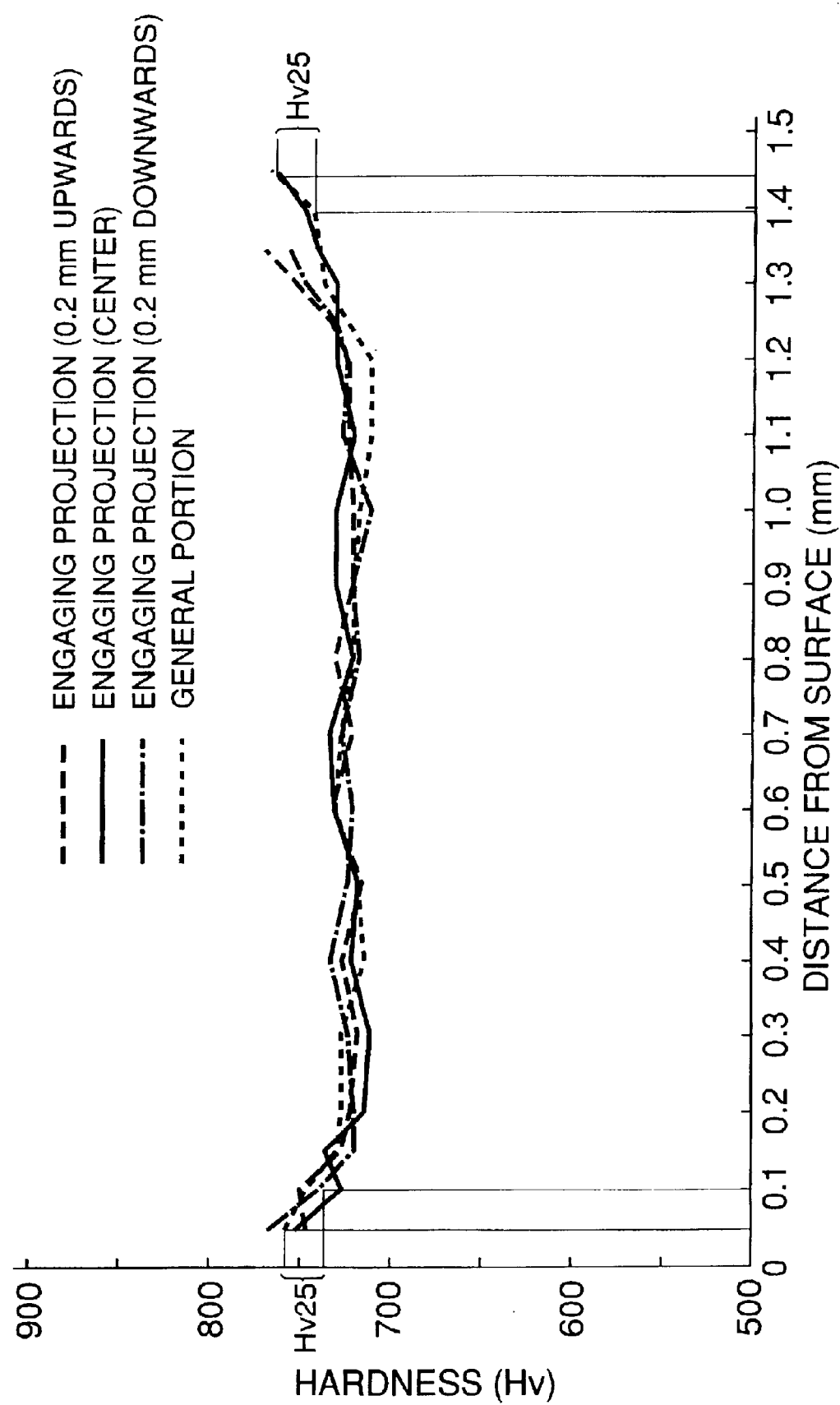
FIG. 6 is a graph showing the relationship between the distance from the surface of the metal element and the hardness.

FIG. 6 shows the relationship between the distance from the surface of the metal element 32 after the thermal treatment and the hardness, as measured in a central position of the engaging projection 43f circular in section, in a position spaced upwards (radially outwards) apart from the central position by 0.2 mm, in a position spaced downwards (radially inwards) apart from the central position by 0.2 mm, and in a general position. FIG. 6 clearly shows that the hardness of the metal element 32 on each of the front and back sides decreases in proportion to the increase of distance from the surface when the distance is in a range of 0.1 mm to 0.2 mm.

Therefore, if a portion of the surface of the metal element 32 having the surface hardness increased by the thermal treatment is removed, the hardness of the corresponding portion is reduced, thereby enhancing the toughness of the corresponding portion. Portions of the metal element requiring enhanced toughness are portions at which stress is likely to concentrate and which are in harsh conditions in terms of the fatigue strength and impact strength. More specifically, the stress concentration portions are the meshed regions shown in FIGS. 3 and 4. In particular, the stress concentration portions are the first undercut portions 46, 46 at the root of the neck 36 of the metal element 32, a root 49 of the engaging projecting 43f, and the recesses 48, 48 in the element body 34, and they are removed by water jet, for example, to a depth of approximately 50 μm.

Figure 7:
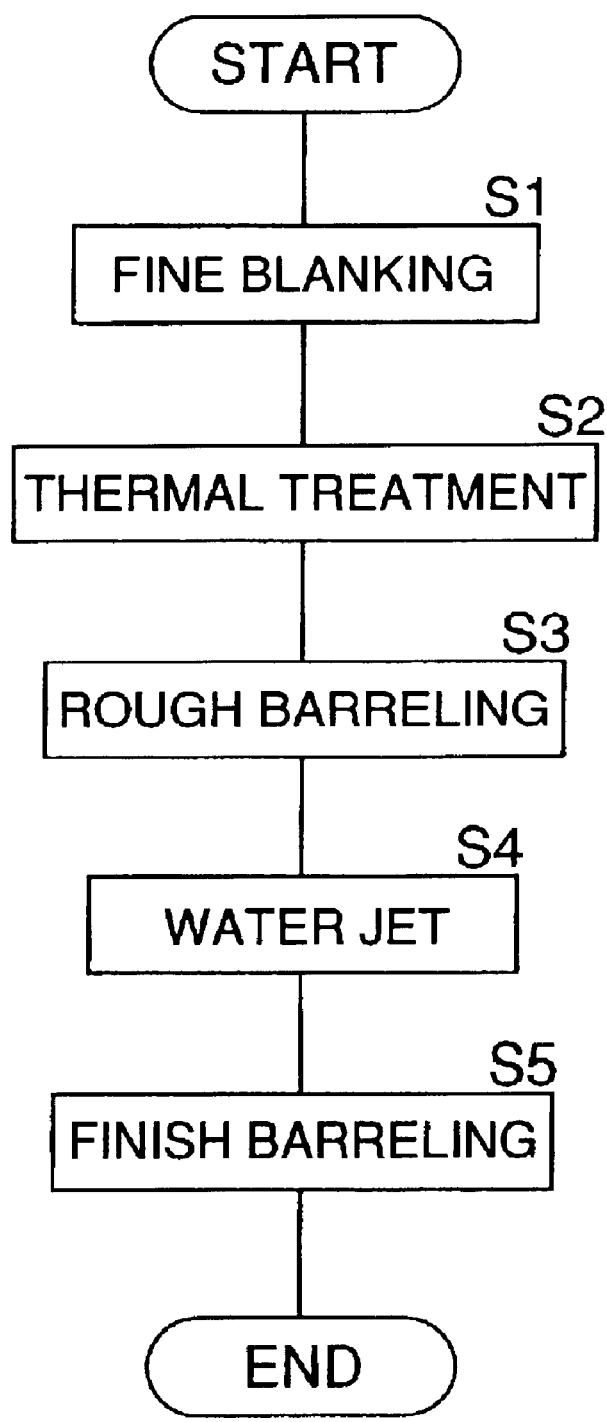
FIG. 7 is a flow chart showing a process for producing the metal element.

A process for producing the metal element 32 will be described below with reference to FIG. 7.

A material for the metal element 32 is a band-shaped plate material having a thickness of approximately 1.5 mm, which is produced by subjecting an ingot of a carbon steel containing Mn or Cr (e.g., SKS95) to hot rolling and then to a spheroidize-annealing treatment. More specifically, the hot rolling provides a structure having cementite phases precipitated reticulately at grain boundaries of a perlite matrix of the ingot. The subsequent spheroidize-annealing treatment provides a structure having cementite phases dispersed in a ferrite phase.

First, at Step S1, a metal element 32 is punched out of the band-shaped plate material having the thickness of approximately 1.5 mm by fine blanking. At Step S2, the metal element 32 is subjected to a thermal treatment including hardening and tempering. A temperature higher than an austenite transformation point (e.g., 800° C.) suffices as the heating temperature during the hardening. The heating temperature is maintained for a predetermined time, and thereafter the metal element is subjected to oil hardening. It is desirable to perform the subsequent tempering at a low temperature (e.g., at 180° C.). The surface of the steel is carburized by a thermal treatment in an atmosphere gas produced by modifying propane and butane by air. As a result of the carburization, the metal element 32 obtains a structure where spherical cementite phases are dispersed in a martensite matrix. The martensite matrix is a factor that increases the hardness of the steel with the increase of the carbon concentration, but deteriorates the toughness.

In addition, upon the carburization of the steel, Mn or Cr contained in the steel is oxidized by a relatively small amount of water ($H_2O$) and carbon dioxide ($CO_2$) contained in the atmosphere gas, whereby a grain boundary oxide represented by $Mn_xO_y$ or $Cr_xO_y$ is produced on the surface of the steel. The grain boundary oxide is also a factor in deteriorating the toughness and fatigue strength of the steel.

Subsequently, the metal element 32 is polished by rough barreling at Step S3. At Step S4, the first undercut portions 46, 46 at the root of the neck 36 of the metal element 32, the root 49 of the engaging projecting 43f, and the recesses 48, 48 in the element body 34 are removed by a water jet treatment, for example, to a depth of approximately 50 μm. See the meshed regions illustrated in FIGS. 3 and 4. In the water jet treatment, water containing glass beads is injected under a high pressure from an injection nozzle to the surface of the metal element 32, which is removed by the glass beads and glass bead fragments. Finally, the metal element 32 is polished by finish barreling at Step S5.

As described above, by removing the surfaces of the first undercut portions 46, 46 at the root of the neck 36 of the metal element 32, the root 49 of the engaging projecting 43f, and the recesses 48, 48 in the element body 34, that is, the portions of the metal element 32 in which the stress concentrates, the identified portions having a high carbon concentration are removed to enhance the toughness, fatigue strength, and impact strength of the metal element 32. In the above-described process, the grain boundary oxide of $Mn_xO_y$ or $Cr_xO_y$ on the surface, which is the factor that deteriorates the toughness and fatigue strength of the metal element 32, is also removed, thereby further enhancing the durability of the metal element 32.

Areas of the metal element 32 which have been not subjected to the water jet treatment maintain a high surface hardness, and a high wear resistance against any contact with adjacent metal elements 32. The root 49 of the engaging projection 43f of the metal element 32 has a lower hardness because the surface thereof has been removed to enhance the toughness. Therefore, if the root 49 of the engaging projection 43f having the lower hardness is brought into contact with the periphery of the engaging bore 43r having a higher hardness, the root 49 is likely to be worn down. However, in the present embodiment, as shown in an enlarged manner in FIG. 4, the curvature radius Rr of the periphery of the engaging bore 43r is larger than the curvature radius Rf of the root 49 of the engaging projection 43f. Accordingly, the root 49 of the engaging projection 43f cannot be brought into contact with the periphery of the engaging bore 43r, thereby preventing the wearing down or eroding of the root 49.

As described above, by lowering the carbon concentration in the portions of the surfaces of the metal element 32 at which the stress concentrates so as to be below the carbon concentration in the other portions, the wear resistance of the sliding portion of the metal element 32 is secured along with the fatigue strength and impact strength of the portions of the metal element 32 at which the stress concentrates. Further, the portions with the reduced surface hardness are the recesses in the metal element 32, which are portions that are difficult to come into contact with the other portions, thereby avoiding a problem of increased wear due to the reduced hardness.

Figure 8:
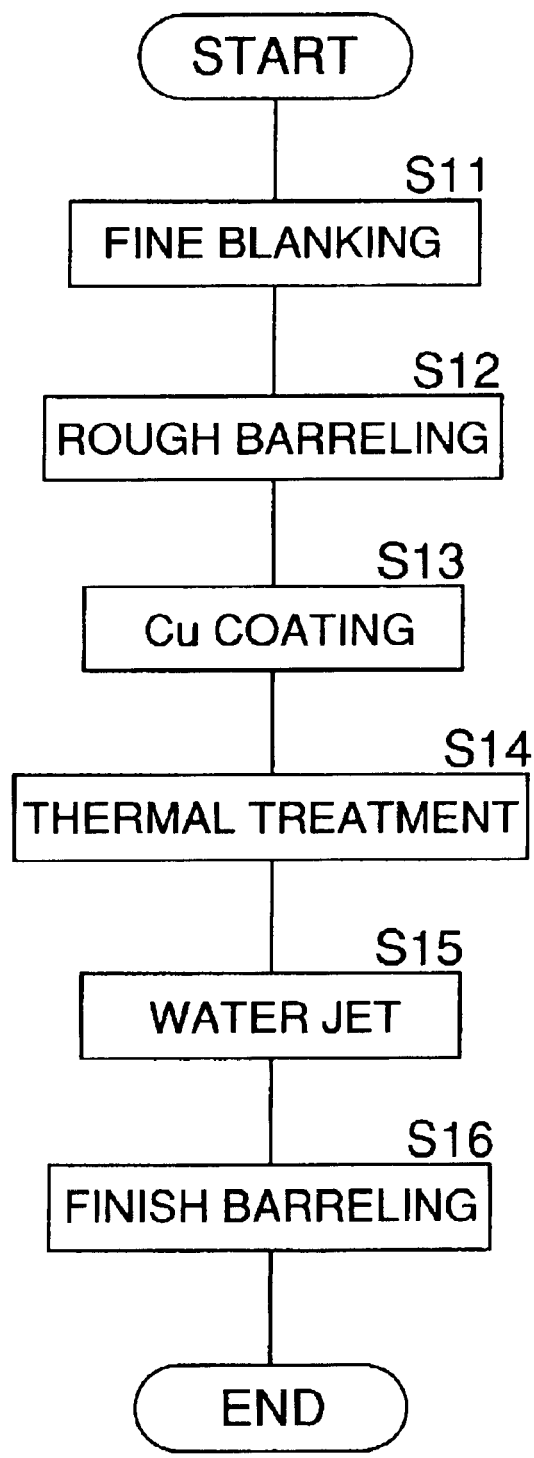
FIG. 8 is a flow chart showing a process for producing a metal element according to a second embodiment.

A second embodiment of the present invention will now be described with reference to FIG. 8.

In the preferred embodiment, the portions of the surface are removed to reduce the carbon concentration after the thermal treatment of the metal element 32. However, in the second embodiment, the carbon concentration of the metal element 32 is reduced by another technique.

First, a metal element 32 is punched out of a band-shaped plate material by fine blanking at Step S11. The metal element is polished by rough barreling at Step S12. The first undercut portions 46, 46 at the root of the neck 36 of the metal element 32, the root 49 of the engaging projecting 43f, and the recesses 48, 48 in the element body 34 are copper plated or coated with a mixture of a copper powder and a liquid glass at Step S13. The metal element 32 is subjected to a thermal treatment including hardening and tempering at Step S14. The portions coated with copper are difficult to carburize because they are not in contact with atmospheric gas during the thermal treatment. Therefore, these portions obtain a carbon concentration lower than that in the other portion, resulting in an enhanced toughness. Subsequently, the metal element 32 is subjected to a water jet treatment at Step S15, and then polished by finish barreling at Step 16. The water jet treatment in the second embodiment is carried out for removing burrs from the metal element 32 rather than for removing particular portions of the metal element 32.

A third embodiment of the present invention will be described below with reference to FIG. 9.

An endless belt 15 includes a single metal ring assembly 31 and a plurality of metal elements 32 supported on the single metal ring assembly 31. Portions of the metal element 32 in the third embodiment which correspond to the portions of the metal element 32 in the preferred embodiment are denoted by the same reference numerals and symbols.

The metal element 32 includes a pair of ears 37, 37 extending radially outward from laterally opposite ends of an element body 34 with a pair of necks 36, 36 interposed therebetween. The metal ring assembly 31 is accommodated in a ring slot 35 defined by the element body 34 and the pair of necks 36, 36. A retainer ring 50 has opposite side edges engaged in locking grooves 51, 51 defined in opposed laterally inner surfaces of the ears 37, 37, thereby retaining the metal ring assembly 31 over an outer peripheral surface. By lowering the carbon concentration in stress-concentration portions of the metal element 32 shown by the mesh in FIG. 9, that is, surfaces of undercut portions 52, 52 at laterally opposite ends of the ring slot 35 and roots 49, 49 of engaging projections 43f, 43f below that in surfaces of other portions by the same technique as in the preferred or second embodiment, the fatigue strength and impact strength of the metal element 32 are enhanced, while securing the wear resistance of the metal element 32.

Although the embodiments of the present invention have been described in detail, it will be understood to one of ordinary skill in the art that the present invention is not limited to the above-described embodiments. Various modifications in the above-described structural design may be made without departing from the spirit and scope of the invention recited in the following claims. For example, the granular material incorporated into the water for the water jet treatment is not limited to the glass beads. Rather, alumina, steel balls, a cast iron powder, and ceramics such as zirconia may be used. It is possible to prevent the generation of a residual compression stress on the removed surface of the metal element by selecting any of the above-listed granular materials and controlling the water injection pressure. Further, the carbon concentration in the surfaces of the second undercut portions 47, 47 of the metal element 32 in the preferred embodiment can be lowered below that in the other portions, and the carbon concentration in the surfaces of the pair of locking grooves 51, 51 and the pair of recesses 48, 48 in the metal element 32 in the third embodiment can be lowered below that in the other portions. See FIG. 9.

What is claimed is:

1. A belt for a continuously variable transmission comprising:
   a metal ring assembly; and
   a plurality of metal elements formed of a carbon steel and supported on the metal ring assembly,
   wherein a carbon concentration in a recess provided in each metal element and in which stress concentrates is lower relative to the carbon concentration in other portions of each metal element to enhance toughness of the recess, and
   wherein the carbon concentration in the recess is lower than the carbon concentration in other portions of each metal element by removing a surface of the recess after subjecting the metal element to a thermal treatment.

2. The belt according to claim 1, wherein the recess is subjected to an anti-carburizing treatment during the thermal treatment of the metal element.

3. The belt according to claim 1, wherein the recess is a connection between an element body and a neck of each metal element.

4. The belt according to claim 1, wherein the recess is a root of an engaging projection that can be fitted into an engaging bore of an adjacent metal element.

5. The belt according to claim 1, wherein the recess is defined on laterally opposite sides of a radially inner face of an element body of each metal element.

6. A belt for a continuously variable transmission, comprising:

a metal ring assembly; and a plurality of metal elements formed of a carbon steel and supported on the metal ring assembly, wherein a carbon concentration in a recess provided in each metal element and in which stress concentrates is lower relative to the carbon concentration in other portions of each metal element to enhance toughness of the recess, wherein the carbon concentration in the recess is lower than the carbon concentration in other portions of each metal element by removing a surface of the recess after subjecting the metal element to a thermal treatment, and wherein the surface of the recess is removed by a water jet.

7. The belt according to claim 6, wherein the recess is subjected to an anti-carburizing treatment during the thermal treatment of the metal element.

8. The belt according to claim 6, wherein the recess is a connection between an element body and a neck of each metal element.

9. The belt according to claim 6, wherein the recess is a root of an engaging projection that can be fitted into an engaging bore of an adjacent metal element.

10. The belt according to claim 6, wherein the recess is defined on laterally opposite sides of a radially inner face of an element body of each metal element.

11. The belt according to claim 6, wherein approximately 50 $\mu$m of the surface is removed.

12. A belt for a continuously variable transmission, comprising:

a metal ring assembly; and a plurality of metal elements formed of a carbon steel and supported on the metal ring assembly, wherein a carbon concentration in a recess provided in each metal element and in which stress concentrates is lower relative to the carbon concentration in other portions of each metal element to enhance toughness of the recess, wherein the carbon concentration in the recess is lower than the carbon concentration in other portions of each metal element by removing a surface of the recess after subjecting the metal element to a thermal treatment, and wherein approximately 50 $\mu$m of the surface is removed.

13. The belt according to claim 12, wherein the recess is subjected to an anti-carburizing treatment during the thermal treatment of the metal element.

14. The belt according to claim 12, wherein the recess is a connection between an element body and a neck of each metal element.

15. The belt according to claim 12, wherein the recess is a root of an engaging projection that can be fitted into an engaging bore of an adjacent metal element.

16. The belt according to claim 12, wherein the recess is defined on laterally opposite sides of a radially inner face of an element body of each metal element.

* * * * *